(12) United States Patent
Barbier et al.

(10) Patent No.: US 6,218,041 B1
(45) Date of Patent: Apr. 17, 2001

(54) BATTERY UNIT AND A PORTABLE BATTERY-OPERATED DEVICE INCLUDING SUCH A BATTERY UNIT

(75) Inventors: Fabrice R. H. Barbier, Saint Saturnin; Vincent Cachard, Le Mans; Alain De Larminat, Saumur, all of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/185,003

(22) Filed: Nov. 3, 1998

(30) Foreign Application Priority Data

Nov. 5, 1997 (EP) .................................................. 97402645

(51) Int. Cl.⁷ .............................. H01M 2/02; H01M 2/10; H01M 2/06
(52) U.S. Cl. ............................ 429/96; 429/121; 429/162; 429/163
(58) Field of Search .................................. 429/124, 127, 429/162, 163, 96, 97, 99, 100, 121

(56) References Cited

U.S. PATENT DOCUMENTS

| | | | |
|---|---|---|---|
| 4,777,563 | * 10/1988 | Teraoka et al. | 361/395 |
| 5,180,644 | * 1/1993 | Bresin et al. | 428/98 |
| 5,432,017 | * 7/1995 | Hassemer et al. | 429/4 |

* cited by examiner

*Primary Examiner*—Carol Chaney
*Assistant Examiner*—Jonathan Crepeau

(57) ABSTRACT

A battery unit may be used in devices and appliances in which a particularly light and flat battery is desired, such as in particular portable telephones. The battery unit has a housing in which one or several cells generating electricity are provided, such as, for example, a lithium polymer cell. The battery unit is provided with output contacts by means of which the cells can be electrically connected to an appliance, for example by means of resilient contacts present in the appliance. The battery unit is further provided with a housing having a number of external walls such as an upper wall, a bottom wall, and side walls. The housing is internally provided with a substantially flat frame with flat ribs for the purpose of reinforcement and one or several recesses between them. The cell or cells is (are) provided in a recess, possibly in several respective recesses, of the frame. An external envelope of thin metal plating is provided around the frame so that the entire assembly is well protected and nevertheless has minimized dimensions and a minimized mass.

11 Claims, 3 Drawing Sheets

BATTERY UNIT AND A PORTABLE BATTERY-OPERATED DEVICE INCLUDING SUCH A BATTERY UNIT

BACKGROUND OF THE INVENTION

1. Field of the Invention

The present invention relates to a battery unit for use in devices and appliances such as portable telephones, which battery unit is provided with a housing, with one or more cells which generate energy, with output contacts for connecting the cells to an appliance, and with external walls comprising an upper wall, a lower wall and side walls. Such a battery unit is known, for example, from its use in various types of portable telephones.

The present invention further relates to a portable battery-operated device including such a battery unit.

2. Description of the Related Art

Manufacturers continuously strive to make battery-operated devices of various kinds, in particular portable devices, as light and as small as possible. It is accordingly essential for the battery used to have the greatest possible capacity accompanied by the smallest possible dimensions and the smallest possible mass. Reference is made in this connection to European patent application 96402738.7 filed earlier by applicant but not yet published, which is deemed to be incorporated in its entirety in the present application by reference. The portable telephone described in said earlier application is provided with a flat, substantially rectangular battery unit which is provided adjacent its long sides with ridges and/or grooves for guiding the battery unit into associated portions of the housing of the portable telephone. The battery unit is provided with an external envelope which at the same time serves as an external part of the telephone. The external envelope is substantially entirely closed and is provided with a number of output contacts at the area of one of the external walls, which contacts achieve an electrical connection with corresponding contact elements of the telephone after the unit has been inserted into the portable telephone.

SUMMARY OF THE INVENTION

The invention has for its object to provide a battery unit of the kind mentioned in the opening paragraph which has a small mass and/or which is constructed such that it can be easily and simply assembled and has the required sturdiness for complying with the various operational requirements. To achieve this, the housing is provided with a substantially flat frame with flat ribs and one or several recesses therebetween, said one or several cells is/are provided in one or several recesses of the frame, and said walls form part of an external envelope which comprises portions of thin metal plating provided around the frame.

The presence of the frame provides the desired sturdiness of the housing. The recesses present between the ribs can be used for accommodating the various internal components of the battery unit and for fastening external components such as the external walls of the housing. A result of this is also that the external walls may be thin, because the sturdiness of the housing is mainly supplied by the frame.

In a preferred embodiment the battery unit is provided with a printed wiring ("printed circuit board" or PCB), with said output contacts, and with connection contacts for connecting said one or several contacts to the PCB, the PCB is present in a recess of the frame, separated from the recess in which said one or several cells is/are present by a separation rib of the frame, and said separation rib is provided with local depressions for the passage of conductors connecting said one or several cells to the PCB within the thickness of the frame. The electric cells and the PCB do not interfere with one another and cannot damage one another because they are present in different recesses of the frame, separated by one or several separation ribs of the frame. Nevertheless, the electric cells can be connected to the PCB by means of conductors which are passed through via the local recesses while remaining within the thickness of the frame.

Preferably, the PCB is in addition provided with electronic circuit elements for the protection and/or control of the operation of the battery unit. In that manner the necessary electronic components can be provided on the PCB and within the space available inside the frame so as to ensure that the battery, in particular the electric cells, is (are) not damaged. Further electronics may also be present, for example for monitoring the amount of charge of the battery, for controlling the charging of the battery, and the like.

In an embodiment of the invention, each cell consists of a lithium polymer cell whose general shape is rectangular, said lithium polymer cell comprises a two-part foil envelope consisting of a trough-shaped part by means of heat and having a bottom, vertical walls and a circumferential flange which merges into the vertical walls and which is parallel to the bottom, and a flat lid provided on the circumferential flange, and the lid and the circumferential flange are united to one another by means of heat sealing. Lithium polymer is a promising technology for future portable batteries and the integration thereof in portable devices such as portable telephones, which will contribute to flat constructions, low cost levels, safety, and freedom of design. The invention is eminently suitable for building thin, flat batteries with lithium polymer cells. A lithium polymer cell is manufactured as a stack, or from layers which are electrically interconnected in parallel or, depending on the application, in series. This stack is subsequently hermetically closed in an envelope so as to prevent moisture penetrating into the cell and damaging it. In the present embodiment of the invention, the envelope of the electric cell comprises a foil envelope in two parts. The one part is shaped by means of heat into a shallow trough in which the stack is placed. A flat, outwardly directed flange surrounds the trough. A flat piece of foil is placed on the trough, acting as a lid and covering the trough entirely, including also the circumferential flange. Then the lid and the flange of the trough are connected to one another by means of heat sealing at the circumference of the foil envelope thus formed. To render possible an electrical connection of the cell to the external world, two or more electrical conductors such as, for example, conductor strips, may be passed between the lid and the flange to the exterior. During the heat-sealing process, these conductors may be fused into the melting foil material of the envelope. After the heat-sealing operation, accordingly, a hermetically closed unit packed in a foil envelope has been obtained, which can be placed in a recess of the frame. In an embodiment the frame is provided with stepped circumferential parts, the circumferential edge of the foil envelope extends over the stepped parts of the frame and is disposed within the thickness dimension of the frame. This may also be utilized here for limiting the thickness dimension of the battery unit.

Preferably, in a further embodiment of the invention the external envelope comprises a trough-shaped part with a bottom, vertical walls, and a circumferential flange which merges into the vertical walls and is parallel to the bottom, and a lid, said foil envelope is provided in the trough-shaped part of the external envelope such that the lid of the foil envelope lies against the bottom of said trough-shaped part, the circumferential flange of the external envelope is bent back over the frame placed therein such that the bent-back portion of said flange covers part of the width of the relevant rib of the frame, said lid of the external envelope is provided over the frame so as to lie with a circumferential edge within the bent-back portion of said flange, and both said bent-back portion and the lid of the external envelope are connected to the frame; A sturdy metal battery unit is created thereby which is nevertheless thin and light and which is provided at its circumference with a circumferential rim which may be used for guiding the battery unit into matching portions of an electrical appliance. If so desired, the plate material of which the external envelope is composed may be provided with local ribs for increasing the strength of the external envelope. In an embodiment, the frame is provided with stepped circumferential parts and the circumferential edge of the lid of the external envelope as well as the bent-back portion extend over the stepped part of the frame and are disposed at least partly within the thickness dimension of the frame. This may be utilized for limiting even further the thickness dimension of the battery unit.

In an interesting embodiment of the invention the external envelope of the battery unit comprises at least one PCB which is connected to the one or more electrical cells. This embodiment uses a PCB as an external part of the housing of the battery unit. this may eliminate the need for any additional PCB within the battery unit, thus further reducing the number of parts and possibly also the outer dimensions and/or the mass of the battery unit.

The invention also relates to a portable battery operated device comprising a battery unit of which the external envelope comprises a trough-shaped part with a bottom, vertical walls, and a circumferential flange which merges into the vertical walls and is parallel to the bottom, and a lid, said foil envelope is provided in the trough-shaped part of the external envelope such that the lid of the foil envelope lies against the bottom of said trough-shaped part, the circumferential flange of the external envelope is bent back over the frame placed therein such that the bent-back portion of said flange covers part of the width of the relevant rib of the frame, said lid of the external envelope is provided over the frame so as to lie with a circumferential edge within the bent-back portion of said flange, and both said bent-back portion and the lid of the external envelope are connected to the frame, the battery unit being disposed to the outside of the device and being inserted with the external flange in a groove present in the device so as to direct the flange to the inside of the device. As the external flange of the external envelope of the battery unit is directed to the inside of the battery operated device, the groove in which this flange is disposed may be accommodated well inwardly also, adding strength to the groove walls.

BRIEF DESCRIPTION OF THE DRAWING

The invention will now be explained in detail, purely by way of example, to which the invention is by no means limited, with reference to an embodiment as shown in the accompanying drawing, in which.

Corresponding parts have been given the same reference numerals in the various Figures.

DESCRIPTION OF THE PREFERRED EMBODIMENTS

Figure 1:
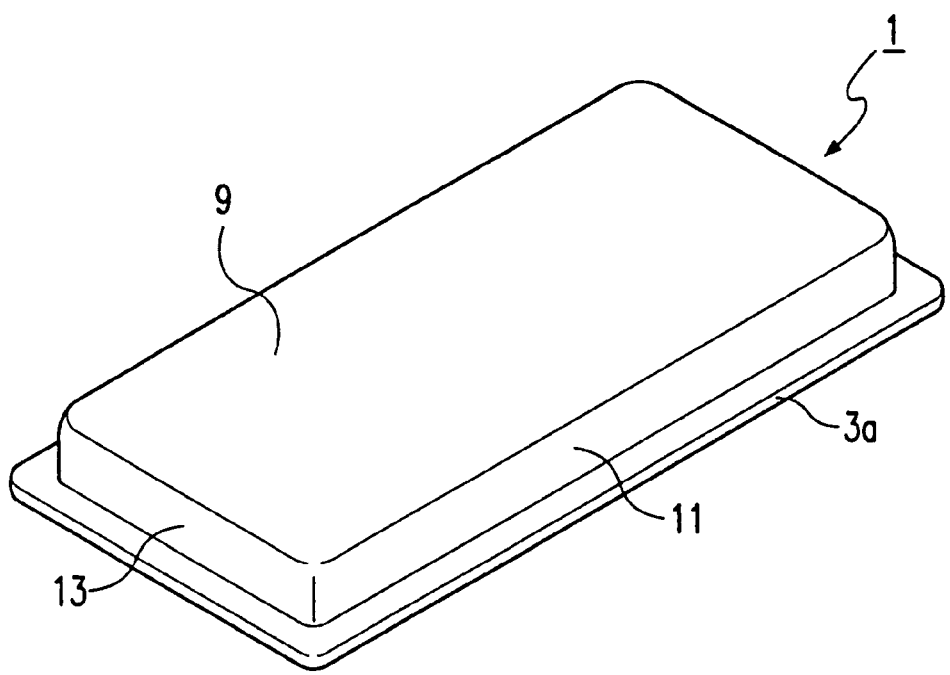
FIG. 1 is a perspective bottom elevation of a lithium polymer battery unit according to the invention provided with four output contacts.
Figure 2:
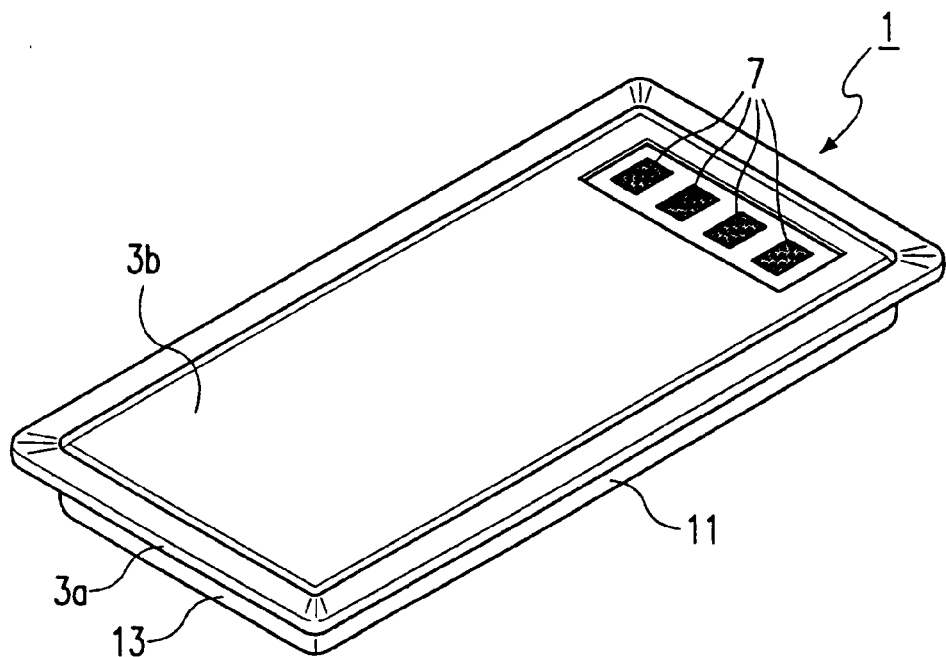
FIG. 2 is a perspective view similar to that of FIG. 1, but now of the upper side of the battery unit of FIG. 1.

The various Figures show a battery unit 1 for use in devices and appliances such as telephones. The battery unit is provided with a housing 3a,b, 15 with a lithium polymer cell 5 and with output contacts 7 for connecting the battery unit to a device.

The external envelope 3a,b of the housing comprises external walls consisting of the upper wall 3b, an opposed lower wall 9, long side walls 11, and short side walls 13. The housing is further provided with a generally flat frame 15, see in particular FIGS. 3 and 4, with long, generally flat ribs 17, short ribs 19 connected thereto, and a connecting rib 21. Between said generally flat ribs, there is a large recess 23 and a smaller recess 25. The lithium polymer cell 5 is provided in the recess 23 of the frame. Said walls 3b, 9, 11, and 13 of the external envelope of the housing are formed by portions of thin metal plating which are provided around the frame 15. The frame may consist of, for example, a synthetic resin, which may be reinforced, and may have a height of approximately 3 mm.

Figure 3:
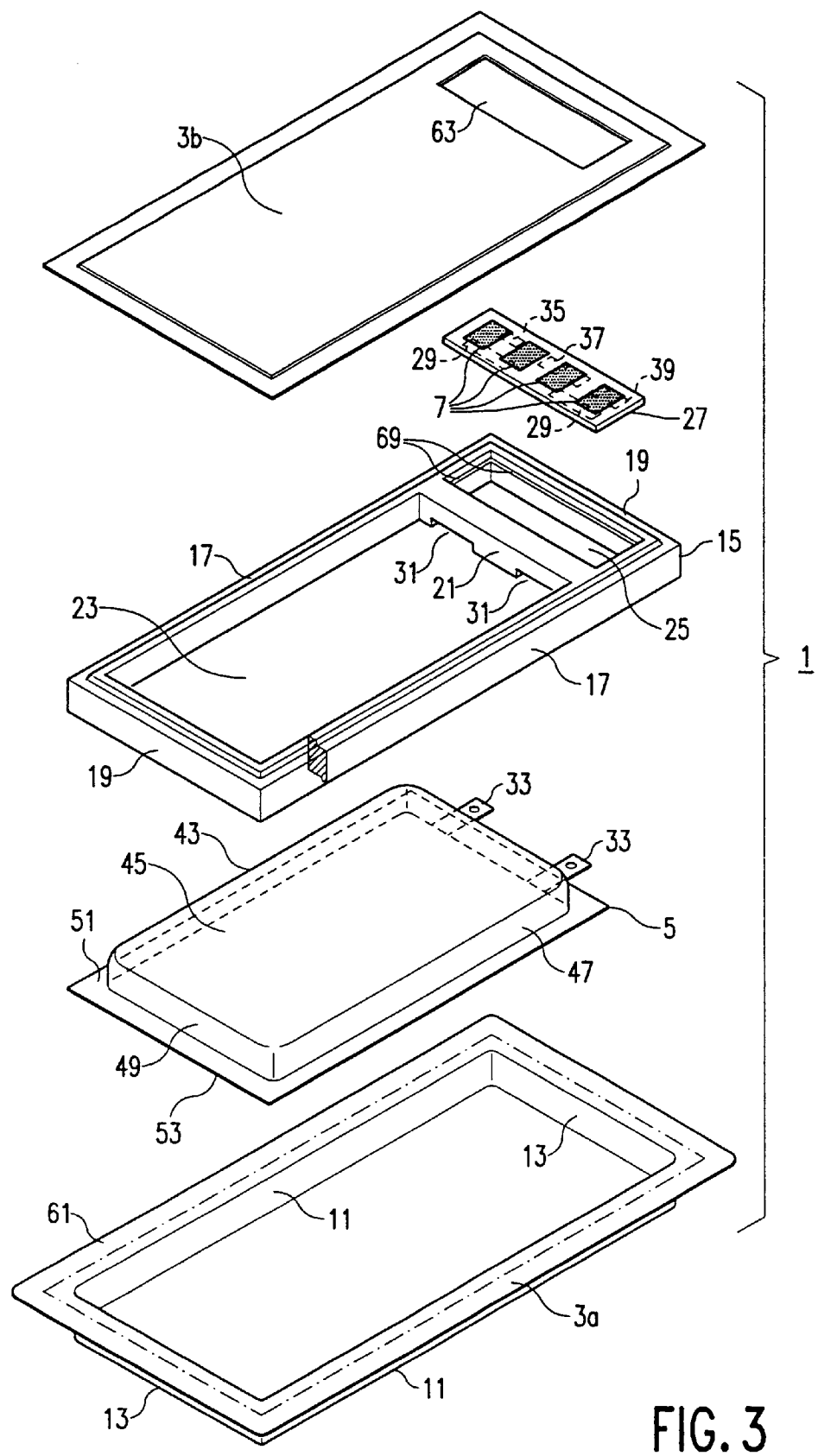
FIG. 3 is an exploded view of the battery unit shown in FIG. 2.

As is apparent especially from FIG. 3, the battery unit is provided with a support plate 27 provided with a printed wiring circuit. This kind of support plate is generally known in many embodiments and is usually referred to as "printed circuit board" or PCB. The PCB 27 is provided with the output contacts 7 mentioned above. At the opposite, rear side, which is not visible in FIG. 3, there are connection contacts 29 which serve for the electrical connection of the electric cell 5. Both the output contacts 7 and the connection contacts 29 are formed as so-called islands on the PCB. These may serve to make contact with resilient contacts of other components or for the fastening of connection wires and the like by means of solder.

The PCB 27 is present in said recess 25 of the frame 15 and is accordingly separated from the recess 23 in which the lithium polymer cell 5 is present by the separation rib 21 of the frame. A satisfactory separation between the PCB and the lithium polymer cell is obtained thereby, so that these two components are securely enclosed within the frame in mutually defined positions. The separation rib 21 is provided with local depressions 31. The lithium polymer cell 5 is provided with strip-shaped conductors 33 which match these depressions. The depth of the depressions 31 and the thickness of the strip-shaped conductors 33 are so adjusted to one another that the strips 33 lie in the depressions 31 in such a manner that the strips do not project above the thickness of the frame when the lithium polymer cell is provided in the recess 23 of the frame 15. The strips 33 make contact with the islands 29 of the PCB 27 and, if so desired, are securely connected thereto by means of soldering.

As is diagrammatically shown in FIG. 3, the PCB 27 is provided with a number of electronic circuit elements, three of which have been given reference numerals: i.e. 35, 37 and 39.

Alternatively the PCB 27 could be dispensed with and one of the walls of the external envelope such as the wall 3b could constitute a PCB itself or at least part of it could constitute a PCB.

Figure 4:
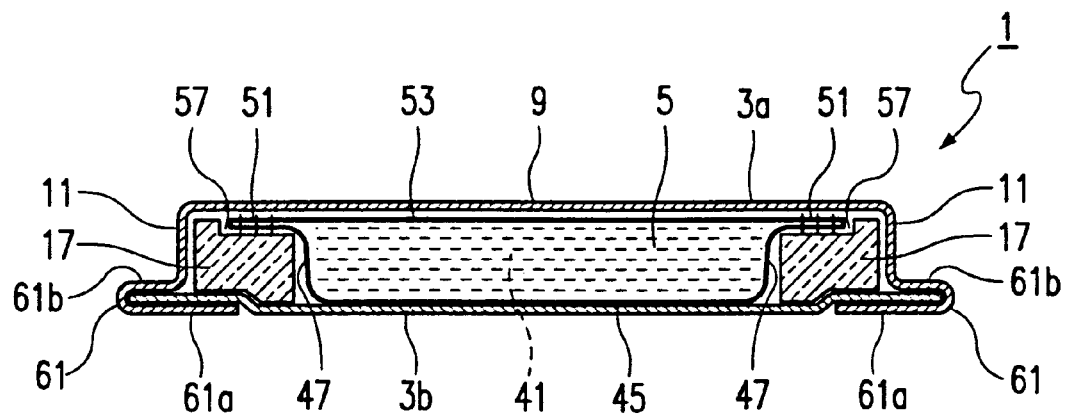
FIG. 4 is a cross-sectional view of the battery unit shown in the preceding Figures.

The lithium polymer cell 5 will now be explained in more detail with reference to FIGS. 3 and 4. The cell is built up in a known manner from a stack of mutually connected layers 41 which in FIG. 4 are indicated very diagrammatically only by means of fully drawn lines. This construction is known per se from the prior art and does not fall within the scope of the invention, so that a detailed description thereof will not be given. Said stack 41 is provided within a foil envelope in a hermetically sealed manner, which envelope comprises a thermally shaped trough-shaped part 43 in the foil material, with a bottom 45, vertical long and short walls 47 and 49, respectively, and a circumferential flange 51 which merges into the vertical walls and which is parallel to the bottom 45. A flat lid 53 which is made from the same foil material lies on the circumferential flange. The strip-shaped conductors 33 are connected to the stack 41 within the foil envelope and are situated between the circumferential flange 51 and the lid 53 of the foil envelope. The lid 53 and the circumferential flange 51 are united to one another by means of heat sealing so as to close the lithium polymer cell hermetically. Since the trough-shaped part and the lid of the foil envelope are manufactured from the same foil material, an excellent fusion between the lid and the trough-shaped part can be achieved through a correct choice of the foil material, and accordingly an excellent hermetic seal. The electrically conducting strips 33 are sealed in into the synthetic-resin material during this process and are accordingly passed through also in a hermetically sealed manner. The heat seal joint is symbolized in FIG. 4 and 5 by means of vertical dashes drawn at the area of the circumferential flange 51 and the portion of the lid 53 resting thereon.

Figure 5:
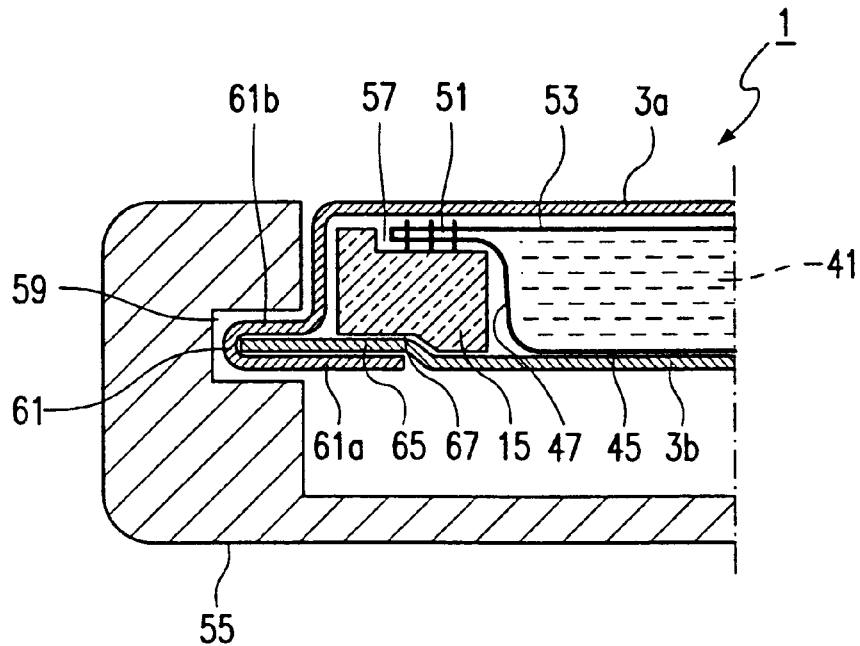
FIG. 5 is a partial view in cross section of a portable telephone incorporating the battery unit of the preceding figures on an enlarged scale.

As is apparent especially from FIG. 4 and 5, the circumferential edge 51 of the foil envelope of the electric cell 5 extends over a stepped part 57 in the width of the ribs 17, 19 and 21 surrounding the recess 23. There is therefore no influence on the thickness of the battery unit, whereas the lateral dimension is minimized. Also the circumferential edge 65 of the lid part 3b extends over a stepped part 67 of the frame 15.

The external envelope of the battery unit, see again in particular FIGS. 3 and 4, also consists of a trough-shaped part 3a and a flat lid 3b. The trough-shaped part comprises a bottom 9, vertical long and short walls 11 and 13, respectively, and a circumferential flange 61 which merges into the vertical walls and which is parallel to the bottom 9. When the electric cell 5 and the frame 15 are placed in the trough-shaped part 3a, it is ensured that the lid 53 of the foil envelope of the electric cell lies against the bottom 9, see FIG. 4.

The circumferential flange 61 of the trough-shaped metal part 3a of the external envelope is used for fixing the trough-shaped part securely against the frame 15. It can be seen in FIG. 4 and 5 that a portion of the circumferential flange 61 is bent back so as to lie over the frame 15. The bent-back portion 61a of the flange 61 accounts for only part of the width of the relevant ribs 17 and 19 of the frame 15. The remaining portion 61b of the circumferential flange 61 together with the opposed portion of the bent portion 61a forms a circumferential rim which may be used for positioning and fastening of the battery unit in an appliance, such as the portable telephones 55 of FIG. 5.

The flat lid 3b of the external envelope lies within the circumference of the bent-back portion 61a of the flange 61. It rests on the stepped portions 67 of the ribs 17, 19 and 21 of the frame 15. Said bent portion 61a of the flange 61 as well as the lid 3b is securely connected to the frame 15, for example by means of gluing. Any known techniques, as desired, may be used for the gluing process. Interposed strips of two-sided adhesive material may also be used for this and/or glue types which are activated under the influence of heat, etc. Fastening methods other than gluing may also be used (screwing, riveting, welding, etc.).

The PCB 27 may be provided on the lid part 3b of the external envelope, for example by means of gluing, at the area of a aperture 63. The frame 15 and the PCB are so co-ordinated with one another by ridges 69 that the PCB is held clamped by the frame against the portion of the bottom 9 which surrounds the aperture 63. The output contacts 7 at the outside of the metal envelope are accessible, see in particular FIG. 1, on account of the aperture 63.

As will be apparent from FIG. 5, the battery unit 1 is exposed to the outside of the telephone device 55. It is inserted in a groove 59 in such a way that the flange 61 is directed to the inside of the telephone. Therefore the groove 59 may be disposed sufficiently within the telephone housing to guarantee that the groove walls have sufficient strength.

Although the invention has been explained with reference to only a single embodiment, the invention is by no means limited thereto, i.e., in view of the foregoing it will be evident to a person skilled in the art that various modifications may be made within the spirit and the scope of the present invention as hereinafter defined by the appended claims and that the present invention is thus not limited to the examples provided. Thus several electric cells may be present inside the battery unit instead of a single electric cell 5. These cells could all be individually accommodated in separate recesses of the frame and be electrically interconnected. It is also possible, however, to provide several separate electric cells within a single recess, if so desired. The battery unit need not be of rectangular shape but can in principle have any suitable shape which may be desired, for example for adapting it to the shape of a specific envisaged appliance.

What is claimed is:

1. A battery unit for use in an electronic device, which battery unit comprises a housing with a cell for generating electricity, with output contacts, and with external walls comprising an upper wall, a lower wall and side walls, the housing being provided with a substantially flat frame with flat ribs and a recess therebetween, said cell being comprised in said recess, and said walls forming part of an external envelope of the battery unit, the external envelope substantially being made of metal plating of which at least portions of are provided around the frame.

2. A battery unit as claimed in claim 1, wherein the battery unit further comprises a support plate with a printed wiring, with said output contacts, and with connection contacts for connecting said cell to the printed wiring, the printed wiring being present in a further recess of the frame, separated from said recess in which said cell is present by a separation rib of the frame, and said separation rib having local depressions for the passage of conductors connecting said cell to the printed wiring within the thickness of the frame.

3. A battery unit as claimed in claim 2, wherein the printed wiring further comprises electronic circuit elements protecting the battery unit.

4. A battery unit as claimed in claim 1, wherein said cell comprises a lithium polymer cell whose general shape is rectangular, said lithium polymer cell comprising a two-part foil envelope having a trough-shaped part shaped by means of heat and having a bottom, vertical walls and a circumferential flange which merges into the vertical walls and which is parallel to the bottom, and a flat lid provided on the circumferential flange, and the lid and the circumferential flange being united to one another by means of heat sealing.

5. A battery unit as claimed in claim 4, wherein the frame comprises stepped circumferential parts and the circumferential flange of the two-part foil envelope extends over the stepped circumferential parts of the frame and is disposed within a thickness dimension of the frame.

6. A battery unit as claimed in claim 4, wherein the external envelope comprises a trough-shaped part with a bottom, vertical walls, and a circumferential flange which merges into the vertical walls and which is parallel to the bottom, and a lid, said two-part foil envelope of said lithium polymer cell being provided in the trough-shaped part of the external envelope such that the lid of the two-part foil envelope lies against the bottom of said trough-shaped part of the external envelope, the circumferential flange of the external envelope being bent back over the frame placed therein such that a bent-back portion of said circumferential flange of the external envelope covers part of the width of a rib of the frame, said lid of the external envelope being provided over the frame so as to lie with a circumferential edge within the bent-back portion of said flange, and both said bent-back portion and the lid of the external envelope being connected to the frame.

7. A battery unit as claimed in claim 6, wherein the frame is provided with stepped circumferential parts and the circumferential edge of the lid of the external envelope as well as the bent-back portion extend over the stepped part of the frame and are disposed at least partly within a thickness dimension of the frame.

8. A battery unit according to claim 1, wherein the external envelope of the battery unit comprises at a printed wiring which is connected to said cell.

9. A battery unit as claimed in claim 2, wherein the printed wiring further comprises electronic circuit elements for controlling of the battery unit.

10. A portable battery-operated device with a battery unit, said battery unit comprising a housing with a cell for generating electricity, with output contacts, and with external walls comprising an upper wall, a lower wall and side walls, the housing being provided with a substantially flat frame with flat ribs and a recess therebetween, said cell being comprised in said recess, and said walls forming part of an external envelope of the battery unit, the external envelope substantially being made of metal plating of which at least portions are provided around the frame, said cell comprising a lithium polymer cell whose general shape is rectangular, said lithium polymer cell comprising a two-part foil envelope having a trough-shaped part shaped by means of heat and having a bottom, vertical walls and a circumferential flange which merges into the vertical walls and which is parallel to the bottom, and a flat lid provided on the circumferential flange, and the lid and the circumferential flange being united to one another by means of heat sealing, the external envelope comprising a trough-shaped part with a bottom, vertical walls, and a circumferential flange which merges into the vertical walls and which is parallel to the bottom, and a lid, said two-part foil envelope of said lithium polymer cell being provided in the trough-shaped part of the external envelope such that the lid of the two-part foil envelope lies against the bottom of said trough-shaped part of the external envelope, the circumferential flange of the external envelope being bent back over the frame placed therein such that a bent-back portion of said circumferential flange of the external envelope covers part of the width of a rib of the frame, said lid of the external envelope being provided over the frame so as to lie with a circumferential edge within the bent-back portion, and both said bent-back portion and the lid of the external envelope being connected to the frame, and the battery unit being exposed to an outside of the device and being inserted with the external flange in a groove present in the device so as to direct the flange to the inside of the device.

11. A portable battery-operated device with a battery unit, said battery unit comprising:

a housing with external walls comprising an upper wall, a lower wall and side walls;

a substantially flat frame with flat ribs, said frame being comprised inside said housing; and at least one cell for generating electricity, said at least one cell being comprised in at least one recess between said flat ribs, said external walls forming part of an external envelope of said battery unit, said external envelope substantially being made of metal plating of which at least portions are provided around the frame.

\* \* \* \* \*